US010562461B2

(12) United States Patent
Pacella

(10) Patent No.: US 10,562,461 B2
(45) Date of Patent: Feb. 18, 2020

(54) MOVABLE VEHICLE CARGO RACK AND SUPPORT STRUCTURE

(71) Applicant: Mahindra N.A. Tech Center, Auburn Hills, MI (US)

(72) Inventor: John P. Pacella, Rochester Hills, MI (US)

(73) Assignee: Mahindra N.A. Tech Center, Auburn Hills, MI (US)

(*) Notice: Subject to any disclaimer, the term of this patent is extended or adjusted under 35 U.S.C. 154(b) by 0 days.

(21) Appl. No.: 16/013,245

(22) Filed: Jun. 20, 2018

(65) Prior Publication Data
US 2019/0389392 A1 Dec. 26, 2019

(51) Int. Cl.
*B60R 9/045* (2006.01)
*B60R 9/06* (2006.01)
(52) U.S. Cl.
CPC .............. *B60R 9/045* (2013.01); *B60R 9/06* (2013.01)
(58) Field of Classification Search
CPC ................................... B60R 9/045; B60R 9/06
USPC .......................................................... 224/403
See application file for complete search history.

(56) References Cited

U.S. PATENT DOCUMENTS

| 4,458,870 | A | * | 7/1984 | Duncan | A47C 7/70 248/279.1 |
| 4,817,838 | A | * | 4/1989 | Kamaya | B60R 9/045 224/319 |
| 4,867,362 | A | * | 9/1989 | Finnegan | B60R 9/045 224/319 |
| 5,002,324 | A | * | 3/1991 | Griffin | B60P 3/42 224/405 |
| 5,037,152 | A | * | 8/1991 | Hendricks | B60R 9/00 296/26.06 |
| 5,431,472 | A | * | 7/1995 | Coffland | B60R 9/00 224/403 |

(Continued)

FOREIGN PATENT DOCUMENTS

WO 2014024130 A1 2/2014

OTHER PUBLICATIONS

International Search Report issued in related PCT Application No. PCT/US2019/033716 dated Sep. 11, 2019.

(Continued)

*Primary Examiner* — Nathan J Newhouse
*Assistant Examiner* — Lester L Vanterpool
(74) *Attorney, Agent, or Firm* — Harness, Dickey & Pierce, P.L.C.

(57) ABSTRACT

A movable cargo rack assembly for installation on the cargo bed rails of a vehicle including a support assembly and a main arch that includes a leading edge, trailing edge, top segment, and side segments. The side segments extend downward from the top segment to body-side ends with insert portions that are received in stake holes in the cargo bed rails. The support assembly has two support arms with attachment ends that are pivotally connected to the cargo bed rails. The support assembly is pivotally connected to the main arch and is movable between a first configuration where the main arch is supported in two forward stake holes and the support arms extend out at an angle from the trailing edge and a second configuration where the main arch is supported in two rearward stake holes and the support arms extend out at an angle from the leading edge.

16 Claims, 4 Drawing Sheets

(56) References Cited

U.S. PATENT DOCUMENTS

| | | | | |
|---|---|---|---|---|
| 5,743,583 | A * | 4/1998 | Lowe | B60P 3/00 |
| | | | | 211/195 |
| 6,655,722 | B2 * | 12/2003 | Bareket | B60P 3/40 |
| | | | | 224/405 |
| 6,971,563 | B2 * | 12/2005 | Levi | B60P 3/40 |
| | | | | 224/403 |
| 7,178,848 | B1 | 2/2007 | Mather et al. | |
| 7,296,836 | B1 * | 11/2007 | Sabo | B60P 3/40 |
| | | | | 296/3 |
| 8,113,563 | B1 * | 2/2012 | McCann | B60P 3/40 |
| | | | | 224/405 |
| 8,191,952 | B2 * | 6/2012 | Mokhtari | B60R 9/00 |
| | | | | 224/405 |
| 8,668,125 | B2 * | 3/2014 | Williams | B60R 9/06 |
| | | | | 224/402 |
| 2004/0134953 | A1 * | 7/2004 | Perez | B60P 3/40 |
| | | | | 224/403 |
| 2011/0013971 | A1 * | 1/2011 | Peng | F16B 7/149 |
| | | | | 403/109.1 |

OTHER PUBLICATIONS

Written Opinion issued in related PCT Application No. PCT/US2019/033716 dated Sep. 11, 2019.

\* cited by examiner

MOVABLE VEHICLE CARGO RACK AND SUPPORT STRUCTURE

FIELD

The present disclosure generally relates to vehicle cargo racks. More specifically, a movable cargo rack assembly for installation on the cargo bed rails of a vehicle such as a pickup truck is disclosed.

BACKGROUND

This section provides background information related to the present disclosure which is not necessarily prior art.

There are a variety of different cargo rack assemblies available for installation on the cargo bed rails of a vehicle such as a pickup truck. The cargo bed rails of a typical pickup truck form the sides of the cargo bed (i.e., cargo area). The top surface of each cargo bed rail, sometimes referred to as the cargo bed rail caps, typically has fairly standardized holes for mounting accessories. These holes are referred to as stake holes or stake pockets. Most pickup trucks typically have at least a forward pair of stake holes positioned in the cargo bed rails near the cab of the pickup truck and a rearward pair of stake holes positioned in the cargo bed rails near the tailgate of the pickup truck. Typical cargo rack assemblies include four upright posts that slide into the stake holes. Cross-members extend between the upright posts at an elevated height to allow for long loads to be hauled by the pickup truck at a position located above the roof of the cab. Such cargo rack assemblies are not movable after they have been installed and have poor aesthetics, particularly when they are not in use (i.e., when they are not carrying a load). Because these cargo rack assemblies do not work as an aesthetic solution, they are mostly used on commercial vehicles rather than on consumer vehicles. Another problem with typical cargo rack assemblies is that they can interfere with the loading of items into the cargo bed from the sides of the vehicle and limit the overall height of an item that can be placed upright in the cargo bed. Additionally, such cargo rack assemblies catch the air flowing off the cab when the vehicle is moving, which can cause buffeting noise and reduced fuel efficiency. There remains a need for a cargo rack assembly that solves these problems and has improved aesthetics over traditional cargo rack assemblies.

SUMMARY

This section provides a general summary of the disclosure and is not a comprehensive disclosure of its full scope or all of its features.

According to the present disclosure, a movable cargo rack assembly for installation on the cargo bed rails of a vehicle is disclosed. The movable cargo rack assembly includes a main arch and a support assembly. The main arch includes a leading edge, a trailing edge, a top segment, and a pair of side segments. The pair of side segments of the main arch extend downward from the top segment to a pair of body-side ends. Each of the body-side ends includes an insertion portion. The insertion portions of the body-side ends are configured to be received in stake holes positioned in the cargo bed rails of the vehicle. The support assembly has a pair of telescopic support arms that includes attachment ends. The attachment ends of the telescopic support arms are configured to be pivotally connected to the cargo bed rails of the vehicle. The support assembly is pivotally connected to the top segment of the main arch. Accordingly, the cargo rack assembly is movable between a first configuration and a second configuration. In the first configuration, the insertion portions of the body-side ends of the main arch are received in a forward pair of stake holes in the cargo bed rails of the vehicle and the pair of telescopic support arms extend out at an angle from the trailing edge of the main arch. In the second configuration, the insertion portions of the body-side ends of the main arch are received in a rearward pair of stake holes in the cargo bed rails of the vehicle and the pair of telescopic support arms extend out at an angle from the leading edge of the main arch.

In the first configuration, the movable cargo rack assembly looks aesthetically similar to a roll bar. As a result, the movable cargo rack assembly mimics the appearance of a roll bar when not in use for significantly improved aesthetics. In addition, the main arch of the movable cargo rack assembly is located adjacent to the cab of the vehicle in the first configuration and therefore catches less air flowing off the cab when the vehicle is moving for reduced buffeting noise and improved fuel economy. In the first configuration, the main arch and the support assembly are also out of the way and do not significantly restrict access to the cargo bed of the vehicle or limit the overall height of items that can be carried upright in the cargo bed. In the second configurations, the main arch extends over the cargo bed near the back end of the vehicle to provide an elevated support for carrying long loads above the cab of the vehicle. Advantageously, the cargo rack assembly can be moved from the first configuration to the second configuration or vice versa without disconnecting the support assembly from the cargo bed rails or the main arch. When unlocked, the telescopic support arms freely extend and pivot to provide sufficient freedom to allow the main arch to be lifted from the forward pair of stake holes, moved aft, and then slid into the rearward pair of stake holes or vice versa. Accordingly, the disclosed movable cargo rack assembly is easy to reconfigure, eliminates the drawbacks associated with traditional cargo rack assemblies without sacrificing functionality, and has improved aesthetics, especially when not in use.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 5 is a side elevation view of the exemplary movable cargo rack assembly illustrated in FIG. 1 showing movement between the first and second configurations.

DETAILED DESCRIPTION

Figure 1:
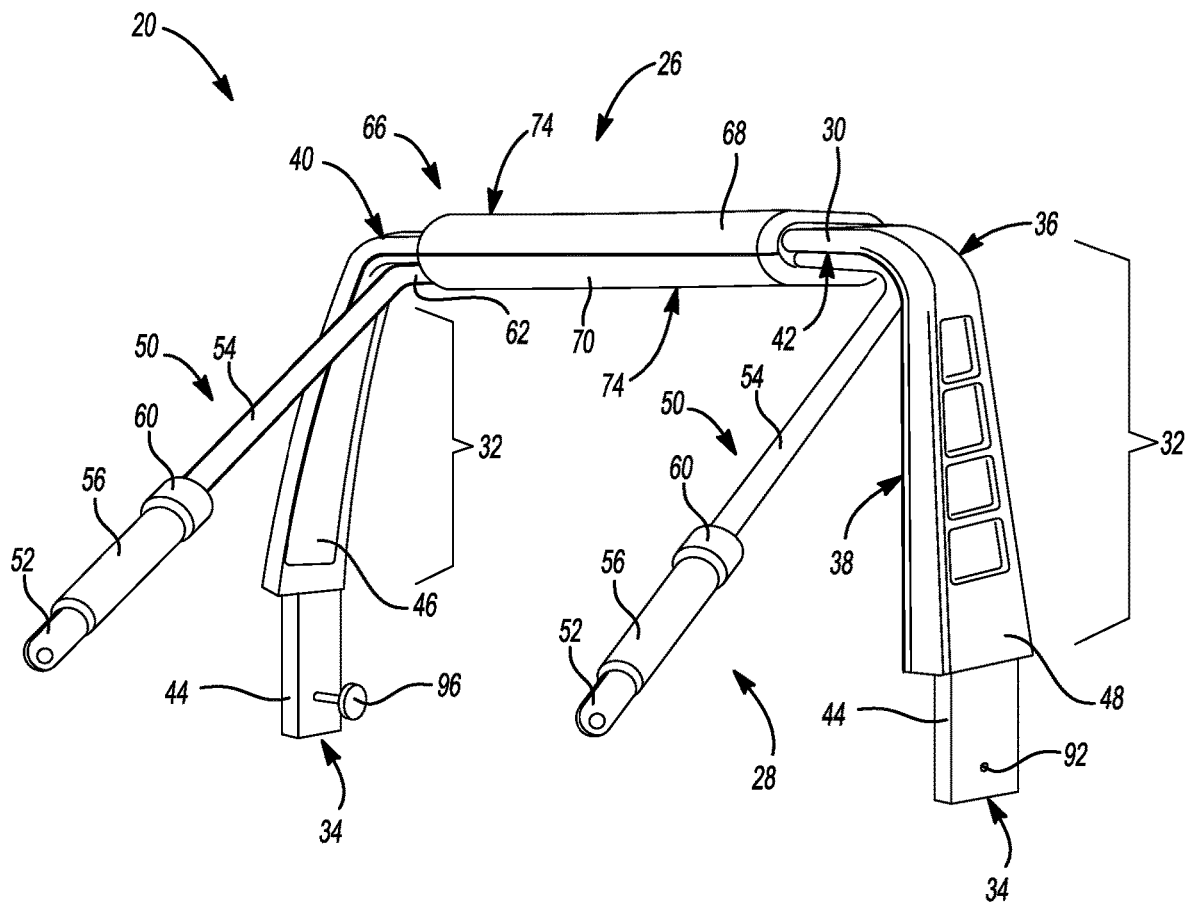
FIG. 1 is a rear perspective view of an exemplary movable cargo rack assembly constructed in accordance with the present disclosure.

Referring to the Figures, wherein like numerals indicate corresponding parts throughout the several views, a movable cargo rack assembly 20 for installation on cargo bed rails 22 of a vehicle 24 is illustrated.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
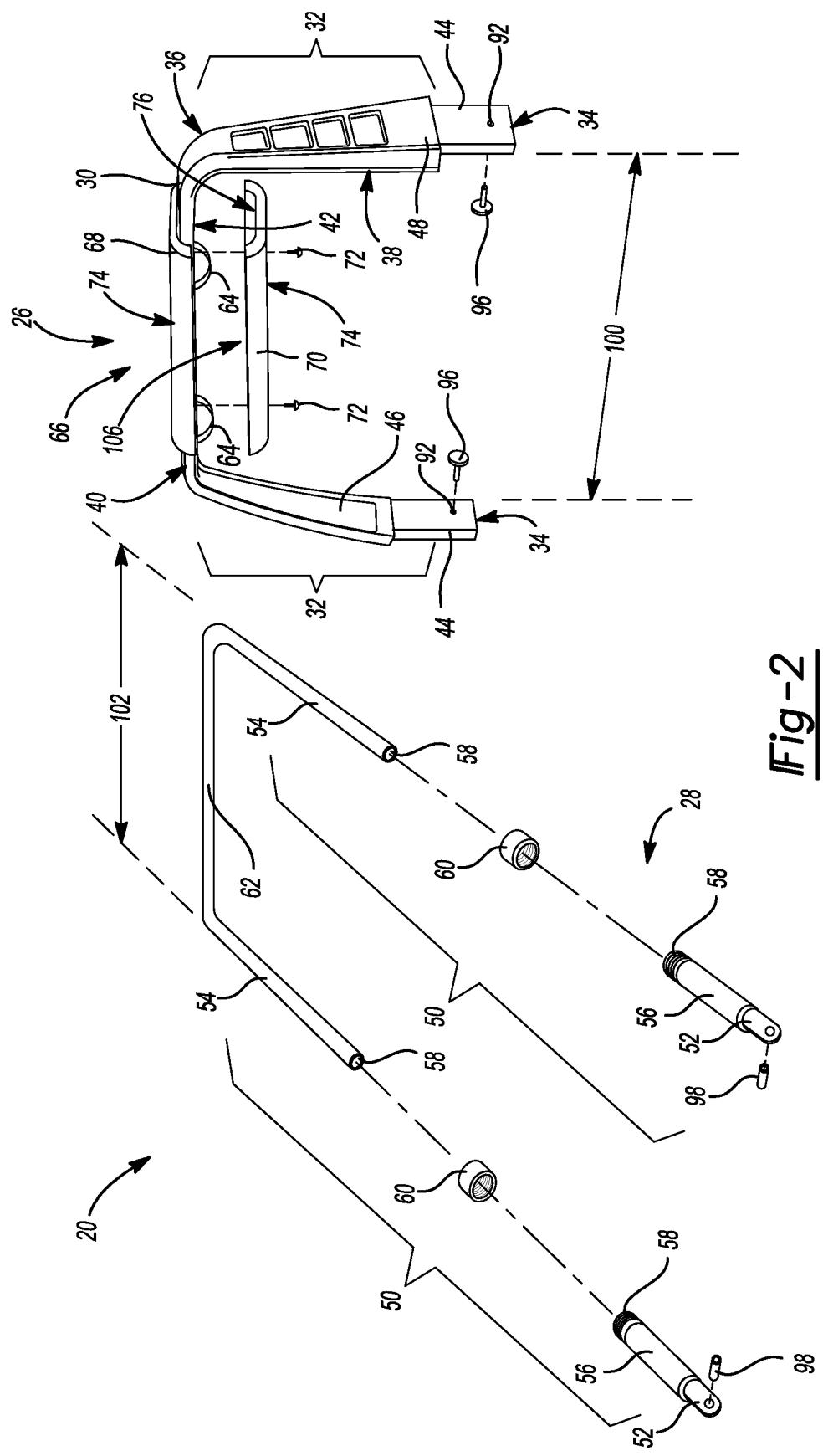
FIG. 2 is an exploded perspective view of the exemplary movable cargo rack assembly illustrated in FIG. 1.
Figure 3:
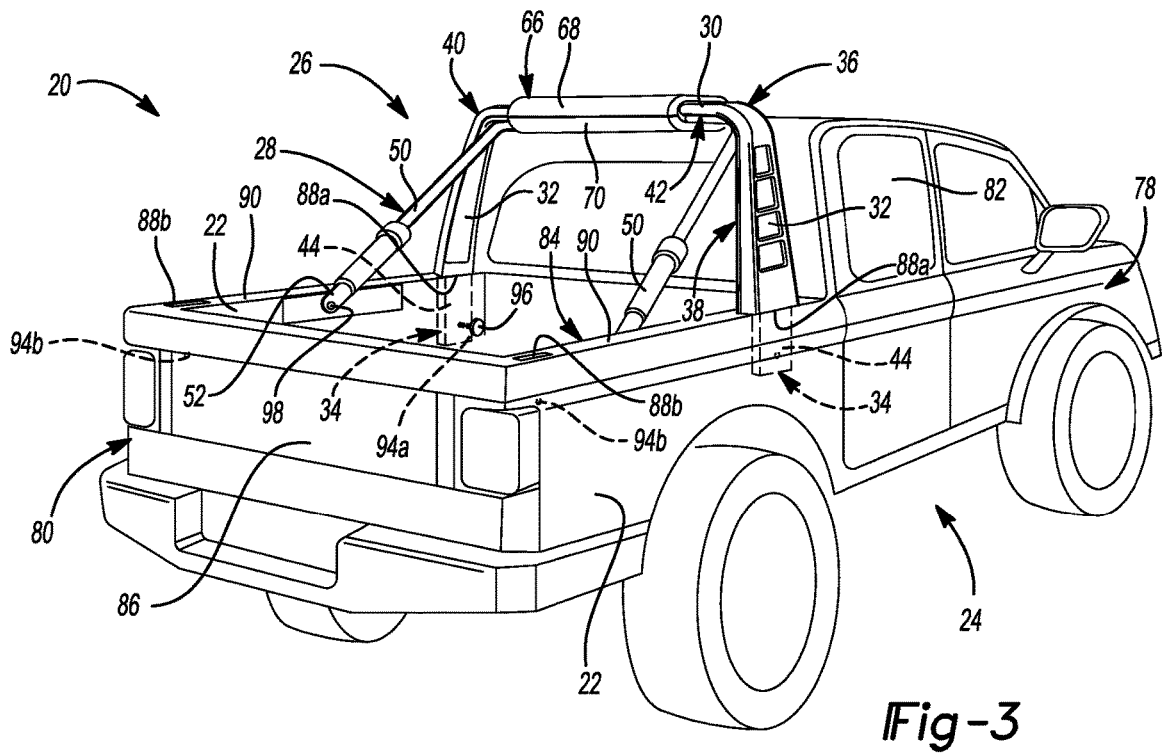
FIG. 3 is a rear perspective view of the exemplary movable cargo rack assembly illustrated in FIG. 1 shown installed on a vehicle in a first configuration.

Referring to FIGS. 1 and 2, the movable cargo rack assembly 20 includes a main arch 26 and a support assembly 28. The main arch 26 includes a top segment 30 and a pair of side segments 32 that extend downward from the top segment 30 to a pair of body-side ends 34. The main arch 26 has a leading edge 36 and a trailing edge 38 opposite the leading edge 36. The top segment 30 of the main arch 26 has an upper surface 40 and a lower surface 42 opposite the upper surface 40. Each of the body-side ends 34 includes an insertion portion 44. The main arch 26 may be constructed in a number of different ways. By way of example and without limitation, the top segment 30 and the side segments 32 of the main arch 26 may be comprised of a structural portion 46 and an outer cowling 48 that extends about at least part of the structural portion 46. In accordance with this embodiment, the structural portion 46 of the main arch 26 provides strength and rigidity while the outer cowling 48 improves the aesthetic appearance of the main arch 26. The materials used for the structural portion 46 and the outer cowling 48 may vary. For example and without limitation, the structural portion 46 may be made of metal and/or thick-walled engineering plastic (i.e., high strength plastic such as glass reinforced plastic) and the outer cowling 48 may be made of plastic or thin-walled engineering plastic. While alternative embodiments are possible, in the illustrated example, the side segments 32 of the main arch 26 are integral with the top segment 30 of the main arch 26 such that the main arch 26 has a U-like shape and the insertion portions 44 of the body-side ends 34 of the main arch 26 are integral with the side segments 32 of the main arch 26.

The support assembly 28 of the movable cargo rack assembly 20 has a pair of telescopic support arms 50 that include attachment ends 52. Each of the telescopic support arms 50 includes an upper tube 54 and a lower tube 56. The attachment ends 52 of the telescopic support arms 50 are positioned on and are defined by the lower tubes 56. The upper and lower tubes 54, 56 have overlapping ends 58 that are concentrically arranged. A releasable coupling 60 permits the upper and lower tubes 54, 56 to slide axially relative to one another in an unlocked position and locks the upper and lower tubes 54, 56 in place in a locked position. Although other structures for the releasable coupling 60 are possible, such as a racket mechanism or spring biased members that extend into incrementally spaced holes in the telescopic support arms 50, in the illustrated embodiment, the releasable coupling 60 on each telescopic support arm 50 is a collar 60 that threadably engages one of the overlapping ends 58 of the upper and lower tubes 54, 56. More specifically, in the illustrated embodiment, the upper tubes 54 are slidingly received in the lower tubes 56 and the collars 60 threadably engage the lower tubes 56. However, it should be appreciated that a reverse configuration is also possible, where the lower tubes 56 are slidingly received in the upper tubes 54 and the collars 60 threadably engage the upper tubes 54.

In the illustrated embodiment, the upper tubes 54 of the telescopic support arms 50 are connected by a cross-bar 62.

The cross-bar 62 extends between the upper tubes 54 and is pivotally connected to the lower surface 42 of the top segment 30 of the main arch 26. In the illustrated embodiment, the cross bar and the upper and lower tubes 54, 56 are cylindrical in shape; however, it should be appreciated that the cross bar and/or the upper and lower tubes 54, 56 may have non-circular cross-sections without departing from the scope of the present disclosure.

The pivoting connection between the cross-bar 62 and the top segment 30 of the main arch 26 may be constructed in a number of different ways. For example, in the illustrated embodiment, the pivoting connection is created by a pair of clamps 64 that extend from the lower surface 42 of the top segment 30 of the main arch 26 and extend circumferentially around part of the cross-bar 62. The clamps 64 retain the support assembly 28 on the main arch 26, but at the same time allow the support assembly 28 to rotate relative to the main arch 26. In the illustrated embodiment, the upper tubes 54 of the telescopic support arms 50 are integral with the cross-bar 62 such that the support assembly 28 has a U-like shape; however, it should be appreciated that other configurations are possible without departing from the scope of the present disclosure. For example, the cross-bar 62 may be eliminated and the telescopic support arms may be pivotally connected to the top segment 30 or the side segments 32 of the main arch 26. Although a variety of different materials for the telescopic support arms 50 are possible, in one non-limiting example, the upper and lower tubes 54, 56 are made of metal.

The movable cargo rack assembly 20 includes a pad assembly 66 that has a top half 68 and a bottom half 70. The top half 68 of the pad assembly 66 that extends over and is mounted to the upper surface 40 of the top segment 30 of the main arch 26. The bottom half 70 of the pad assembly 66 extends over the lower surface 42 of the top segment 30 of the main arch 26 and, in the illustrated embodiment, is removably attached to the top half 68 of the pad assembly 66 by one or more fasteners 72. A variety of fasteners can be used for this purpose including, without limitation, thumb screws. It should be appreciated that alternative configurations are possible. For example, the bottom half 70 of the pad assembly 66 may alternatively be removably attached to the top segment 30 of the main arch 26 by one or more fasteners 72. The top half 68 and the bottom half 70 of the pad assembly 66 nest with each other in a clam-shell arrangement around the top segment 30 of the main arch 26. However, it should be appreciated that the top half 68 and the bottom half 70 do not necessarily have to be equal in size or form precisely half of the pad assembly 66.

The top half 68 and the bottom half 70 of the pad assembly 66 each has a padded surface 74. When the top half 68 and the bottom half 70 of the pad assembly 66 are installed on the top segment 30 of the main arch 26, the padded surfaces 74 of the top half 68 and the bottom half 70 of the pad assembly 66 face away from the upper and lower surfaces 40, 42 of the top segment 30 of the main arch 26, respectively. Although a variety of different constructions and materials for the pad assembly 66 are possible, in one non-limiting example, the top half 68 and bottom half 70 may be made of plastic and the padded surfaces 74 may be made of foam.

Optionally, the main arch 26 can include a storage cavity 76. In the illustrated embodiment, the storage cavity 76 is formed by the bottom half 70 of the pad assembly 66. In accordance with this embodiment, the storage cavity 76 can be accessed by removing the bottom half 70 of the pad assembly 66 from the top segment 30 of the main arch 26.

The storage cavity 76 is sized to accept gear. For example, the storage cavity 76 provides space to store tie-down straps when they are not in use. In another embodiment (not shown), the storage cavity 76 is formed in the outer cowling 48 of the main arch 26.

With additional reference to FIGS. 3-6, when the movable cargo rack assembly 20 is installed on the vehicle 24, the leading edge 36 of the main arch 26 faces a front end 78 of the vehicle 24, the trailing edge 38 of the main arch 26 faces a back end 80 of the vehicle 24. The upper surface 40 of the top segment 30 of the main arch 26 faces away from the cargo bed rails 22 of the vehicle 24 and the lower surface 42 of the top segment 30 of the main arch 26 faces the cargo bed rails 22 of the vehicle 24. It should be appreciated and understood that the front end 78 of the vehicle 24 typically includes head lights and the wheels that steer while the back end 80 of the vehicle 24 typically includes tail lights and non-steerable wheels. In the illustrated embodiment, the vehicle 24 includes a cab 82 positioned near the front end 78 of the vehicle 24 and a cargo bed 84 positioned near the back end 80 of the vehicle 24. The cargo bed 84 is bounded fore and aft by the cab 82 and a tailgate 86 and is bounded on the sides by cargo bed rails 22. The cargo bed rails 22 include a forward pair of stake holes 88a and a rearward pair of stake holes 88b that are positioned along and extend into a top surface 90 of the cargo bed rails 22. The stake holes 88a, 88b, which are also referred to as stake pockets, are generally rectangular in shape and allow accessories to be mounted to the cargo bed rails 22.

The insertion portions 44 of the body-side ends 34 are configured to be removably and slidingly received in the stake holes 88a, 88b in the cargo bed rails 22 of the vehicle 24. The insertion portions 44 of the body-side ends 34 have a rectangular cross-sectional shape and are sized to fit inside the stake holes 88 in the cargo bed rails 22. Although, the stake holes 88a, 88b and the insertion portions 44 of the body-side ends 34 are rectangular in the illustrated embodiment, it should be appreciated that other shapes are possible and are considered to be within the scope of the present disclosure.

Optionally, the insertion portions 44 of the body-side ends 34 of the main arch 26 include pin holes 92 that are positioned in alignment with corresponding holes 94a, 94b in the cargo bed rails 22 of the vehicle 24 when the insertion portions 44 of the body-side ends 34 of the main arch 26 are received in the stake holes 88a, 88b. Fasteners 96 may be inserted into these holes 92, 94a, 94b to retain the insertion portions 44 of the body-side ends 34 of the main arch 26 in the stake holes 88a, 88b in the cargo bed rails 22 of the vehicle 24. The fasteners 96 may be provided in the form of a pair of main arch pins 96 that are configured to be removably and slidingly received in the pin holes 92 in the insertion portions 44 of the body-side ends 34 of the main arch 26 and the corresponding holes 94 in the cargo bed rails 22. The main arch pins 96 may have a head and a shank that is threaded or that has a spring biased ball that retains the main arch pins 96 in the holes 92, 94a, 94b.

The attachment ends 52 of the pair of telescopic support arms 50 are configured to be pivotally connected to the cargo bed rails 22 of the vehicle 24. This, in combination with the pivoting connection between the support assembly 28 and the main arch 26, allows the movable cargo rack assembly 20 to be arranged in a first configuration and a second configuration. In the first configuration (illustrated in FIG. 3), the insertion portions 44 of the body-side ends 34 of the main arch 26 are received in the forward pair of stake holes 88a in the cargo bed rails 22 of the vehicle 24 and the pair of telescopic support arms 50 extend out at an angle from the trailing edge 38 of the main arch 26. In the second configuration (illustrated in FIG. 4), the insertion portions 44 of the body-side ends 34 of the main arch 26 are received in the rearward pair of stake holes 88b in the cargo bed rails 22 of the vehicle 24 and the pair of telescopic support arms 50 extend out at an angle from the leading edge 36 of the main arch 26.

The attachment ends 52 of the lower tubes 56 of the support assembly 28 are pivotally connected to the cargo bed rails 22 by fasteners 98. These fasteners 98 may be provided in the form of a pair of support assembly pins 98 that extend through the attachment ends 52 of the lower tubes 56 to pivotally connect the telescopic support arms 50 to the cargo bed rails 22 of the vehicle 24. As shown in FIG. 5, this arrangement allows the attachment ends 52 to remain pivotally connected to the cargo bed rails 22 of the vehicle 24 when the movable cargo rack assembly 20 is moved from the first configuration to the second configuration or vice versa. When the collars 60 are in the unlocked position, the telescopic support arms 50 freely extend and pivot to provide sufficient freedom to allow the main arch 26 to be lifted from the forward pair of stake holes 88a (FIG. 3), moved aft (FIG. 5), and then slid into the rearward pair of stake holes 88b (FIG. 4) or vice versa.

Figure 4:
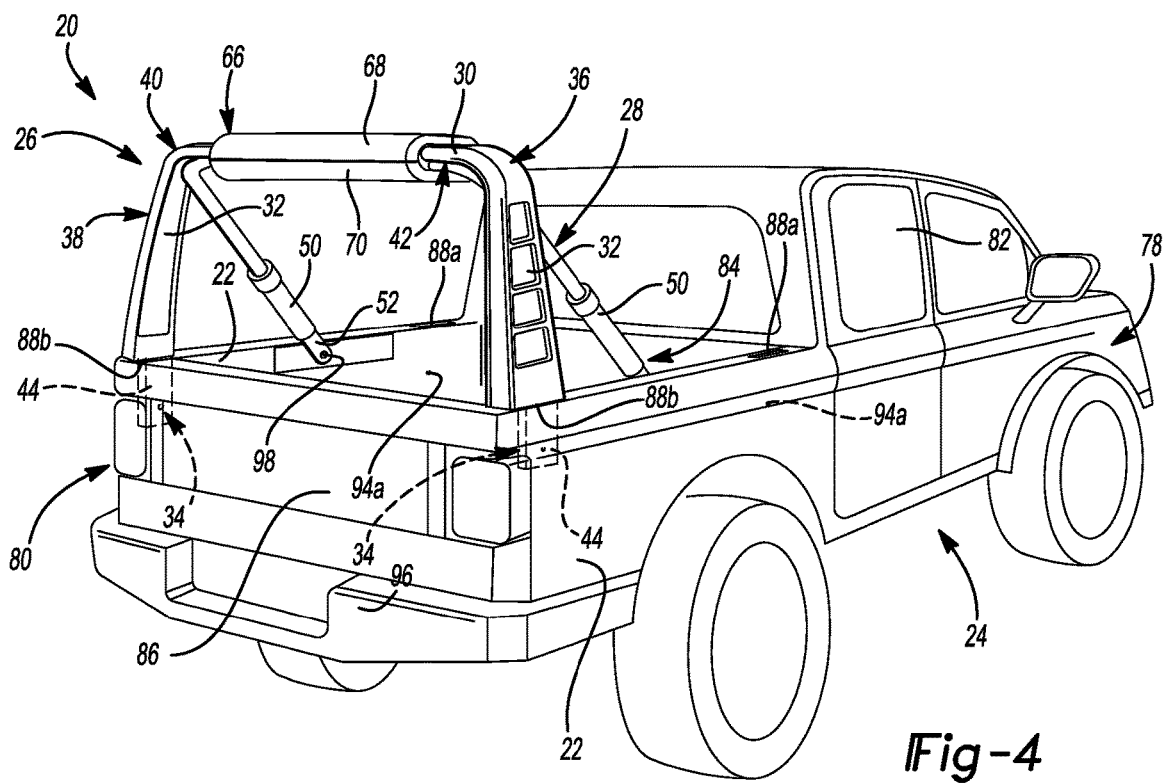
FIG. 4 is a rear perspective view of the exemplary movable cargo rack assembly illustrated in FIG. 1 shown installed on the vehicle in a second configuration.

As shown in FIG. 2, the main arch 26 has an inside width 100 between the side segments 32 and the support assembly 28 has an outside width 102 between the telescopic support arms 50. The inside width 100 of the main arch 26 is larger than the outside width 102 of the support assembly 28 at any given height above the cargo bed rails 22 such that the side segments 32 of the main arch 26 pass/swing to the outside of the telescopic support arms 50 when the main arch 26 is moved aft from the first configuration (FIG. 3) to the second configuration (FIG. 4).

To move the movable cargo rack assembly 20 from the first configuration to the second configuration, the following steps are performed. First, the collars 60 are loosened (i.e., placed in the unlocked position) to allow the upper and lower tubes 54, 56 of the telescopic support arms 50 to slide freely relative to one another and the main arch pins 96 are pulled out from the pin holes 92 in the insertion portions 44 of the body-side ends 34 of the main arch 26 and the corresponding holes 94a in the cargo bed rails 22 adjacent to the forward pair of stake holes 88a. Next, the main arch 26 is pulled upward until the insertion portions 44 of the body-side ends 34 of the main arch 26 are lifted out of the forward pair of stake holes 88a in the cargo bed rails 22. The main arch 26 is then moved aft towards the back end 80 of the vehicle 24 (as shown in FIG. 5) and the insertion portions 44 of the body-side ends 34 of the main arch 26 are slid into the rearward pair of stake holes 88b in the cargo bed rails 22. The collars 60 are tightened (i.e., placed in the locked position) to lock the upper and lower tubes 54, 56 of the telescopic support arms 50 in place and the main arch pins 96 are inserted into the pin holes 92 in the insertion portions 44 of the body-side ends 34 of the main arch 26 and the corresponding holes 94b in the cargo bed rails 22 adjacent to the rearward pair of stake holes 88b. The movable cargo rack assembly 20 can be moved from the second configuration back to the first configuration by performing these steps in reverse order.

In the first configuration (FIG. 3), the movable cargo rack assembly 20 looks aesthetically similar to a roll bar. As a result, the movable cargo rack assembly 20 mimics to appearance of a roll bar when not in use for significantly improved aesthetics. In addition, the main arch 26 of the movable cargo rack assembly 20 is located adjacent to the cab 82 of the vehicle 24 in the first configuration and therefore catches less air flowing off the cab 82 when the vehicle 24 is moving. In the first configuration, the main arch 26 and the support assembly 28 are also out of the way and do not significantly restrict access to the cargo bed 84 of the vehicle 24 or limit the overall height of items that can be carried upright in the cargo bed 84. In the second configurations (FIG. 4), the main arch 26 extends over the cargo bed 84 near the back end 80 of the vehicle 24 to provide an elevated support for carrying long loads above the cab 82 of the vehicle 24.

Figure 6:
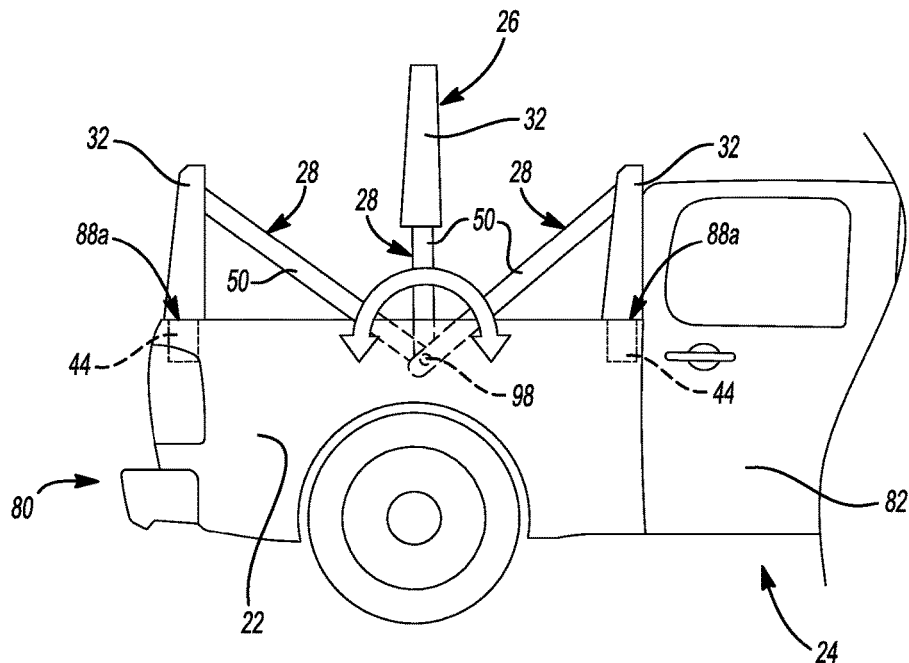
FIG. 6 is another rear perspective view of the exemplary movable cargo rack assembly illustrated in FIG. 4 shown supporting an exemplary cargo load.
Figure 6:
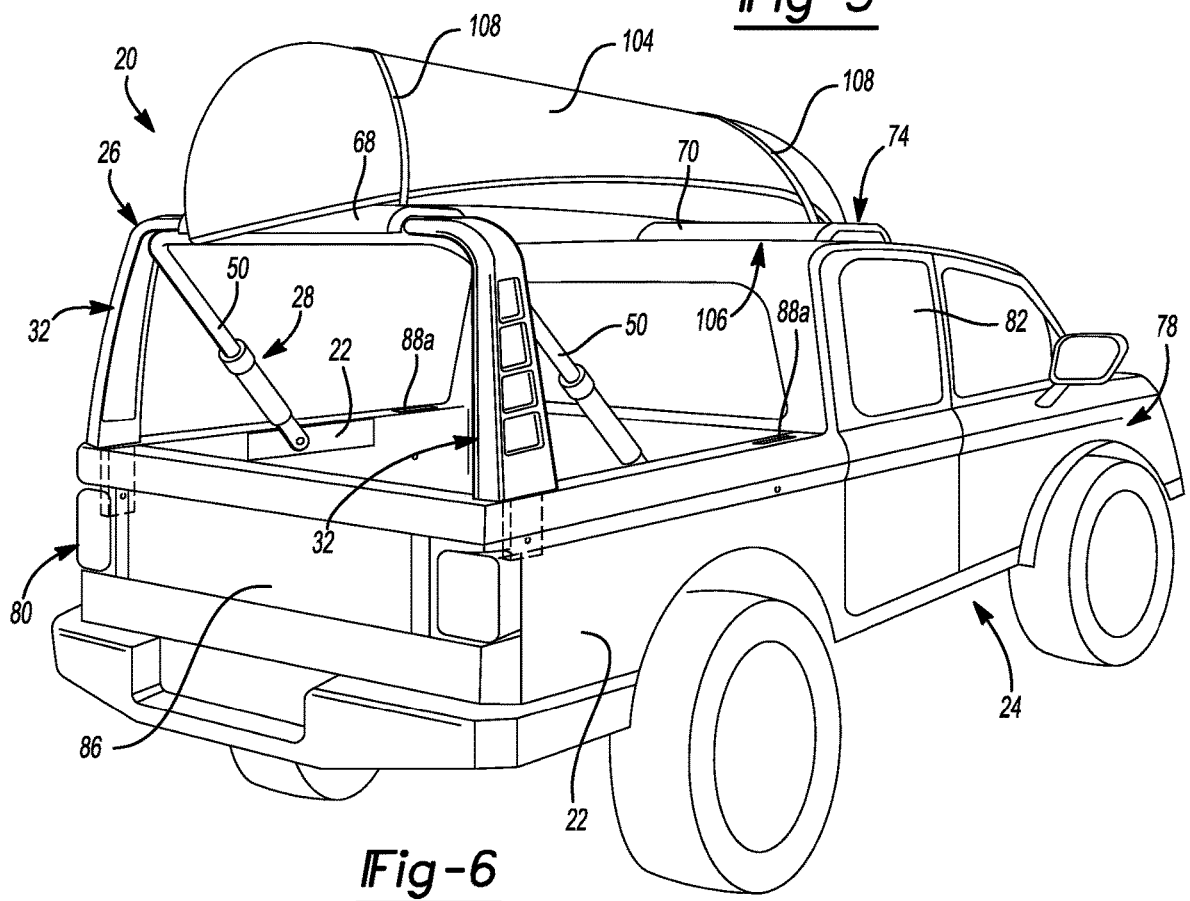

FIG. 6 illustrates the movable cargo rack assembly 20 supporting an exemplary load 104 over the cab 82 of the vehicle 24. As shown in this figure, the bottom half 70 of the pad assembly 66 is configured to be placed upside-down on the roof of the cab 82 after the bottom half 70 of the pad assembly 66 is removed from the main arch 26 to provide a forward support point for the load 104. The top half 68 of the pad assembly 66 remains fixed to the top segment 30 of the main arch 26 and therefore provides a rearward support point for the load 104. Optionally, the bottom half 70 of the pad assembly 66 includes a slip resistant surface 106, opposite the padded surface 74, that is configured to rest on the roof of the cab 82 when the bottom half 70 of the pad assembly 66 has been placed on the roof. The slip resistant surface 106 prevents the bottom half 70 of the pad assembly 66 from sliding on the roof and/or scratching the paint of the vehicle 24. Although a number of different materials are possible, the slip resistant surface 106 may be made of an elastomeric material such as rubber. Tie-down straps 108 may be used for securing the load 104 to the main arch 26 and the cab 82 of the vehicle 24. As noted above, these tie-down straps 108 can be stored in the optional storage cavity 76 formed by the bottom half 70 of the pad assembly 66 or the outer cowling 48 of the main arch 26 when the bottom half 70 of the pad assembly 66 is re-attached to the main arch 26 and the tie-down straps 108 are not in use. The exemplary load 104 shown in FIG. 5 is a canoe; however, it should be appreciated that the movable cargo rack assembly 20 is designed to accommodate any number of long loads, including without limitation, boats, lumber, pipes, other building materials, ladders, and furniture.

Many modifications and variations of the present disclosure are possible in light of the above teachings and may be practiced otherwise than as specifically described while within the scope of the appended claims. These antecedent recitations should be interpreted to cover any combination in which the inventive novelty exercises its utility. With respect to the method set forth herein, the order of the steps may depart from the order in which they appear without departing from the scope of the present disclosure. Additionally, various steps of the method may be performed sequentially or simultaneously in time.

What is claimed is:

1. A movable cargo rack assembly for installation on cargo bed rails of a vehicle, said movable cargo rack assembly comprising:
    a main arch including a leading edge, a trailing edge, a top segment, and a pair of side segments that extend downward from said top segment to a pair of body-side ends;
    each of said pair of body-side ends including an insertion portion, said insertion portions of said pair of body-side ends being configured to be received in stake holes positioned in the cargo bed rails of the vehicle; and a support assembly having a pair of support arms that includes attachment ends configured to be pivotally connected to the cargo bed rails of the vehicle, said support assembly being pivotally connected to said top segment of said main arch for movement between a first configuration where said pair of support arms extend out at an angle from said trailing edge of said main arch and a second configuration where said pair of support arms extend out at an angle from said leading edge of said main arch, wherein each support arm includes a telescopic support arm including an upper tube and a lower tube with overlapping ends that are concentrically arranged and wherein each telescopic support arm includes a releasable coupling that permits said upper and lower tubes to slide axially relative to one another in an unlocked position and that locks said upper and lower tubes in place in a locked position, wherein said upper tubes of said pair of telescopic support arms are connected by a cross-bar that extends between said upper tubes and that is pivotally connected to said main arch, wherein said top segment of said main arch includes an upper surface and a lower surface and wherein said cross-bar is pivotally connected to said lower surface of said top segment of said main arch by a pair of clamps that extend circumferentially around at least part of said cross-bar.

2. The movable cargo rack assembly set forth in claim 1, wherein said attachment ends of said pair of telescopic support arms are positioned on and are defined by said lower tubes.

3. The movable cargo rack assembly set forth in claim 2, further comprising:

a pair of support assembly pins extending through said attachment ends to pivotally connect said attachments ends of said lower tubes to the cargo bed rails of the vehicle such that said attachment ends remain pivotally connected to the cargo bed rails of the vehicle when said movable cargo rack assembly is moved between said first and second configurations.

4. The movable cargo rack assembly set forth in claim 1, wherein said releasable coupling is a collar that threadably engages one of said overlapping ends of said upper and lower tubes.

5. The movable cargo rack assembly set forth in claim 1, wherein said insertion portions of said pair of body-side ends of said main arch have a cross-sectional shape that is sized to fit inside the stake holes in the cargo bed rails of the vehicle and wherein said insertion portions of said pair of body-side ends of said main arch include pin holes that are positioned in alignment with corresponding holes in the cargo bed rails of the vehicle when said insertion portions of said pair of body-side ends of said main arch are received in the stake holes in the cargo bed rails of the vehicle.

6. The movable cargo rack assembly set forth in claim 5, further comprising:

a pair of main arch pins that are configured to be removably and slidingly received in said pin holes in said insertion portions of said pair of body ends of said main arch and the corresponding holes in the cargo bed rails of the vehicle to retain said insertion portions of said pair of body-side ends of said main arch in the stake holes in the cargo bed rails of the vehicle.

7. A movable cargo rack assembly for installation on cargo bed rails of a vehicle, said movable cargo rack assembly comprising:

a main arch including a leading edge, a trailing edge, a top segment, and a pair of side segments that extend downward from said top segment to a pair of body-side ends;

each of said pair of body-side ends including an insertion portion, said insertion portions of said pair of body-side ends being configured to be received in stake holes positioned in the cargo bed rails of the vehicle;

a support assembly having a pair of support arms that includes attachment ends configured to be pivotally connected to the cargo bed rails of the vehicle, said support assembly being pivotally connected to said top segment of said main arch for movement between a first configuration where said pair of support arms extend out at an angle from said trailing edge of said main arch and a second configuration where said pair of support arms extend out at an angle from said leading edge of said main arch; and a pad assembly including a top half that extends over and is mounted to said main arch and a bottom half that that is removably attached to at least one of said top half of said pad assembly and said top segment of said main arch by at least one fastener, wherein said top half and said bottom half of said pad assembly include a padded surface.

8. The movable cargo rack assembly set forth in claim 7, wherein said bottom half of said pad assembly includes a slip resistant surface made of an elastomeric material, opposite said padded surface, that is configured to rest on a roof of the vehicle when said bottom half of said pad assembly is removed from said top segment of said main arch.

9. The movable cargo rack assembly set forth in claim 7, wherein said main arch includes a storage cavity formed by said bottom half of said pad assembly.

10. A movable cargo rack assembly for installation on cargo bed rails of a vehicle, said movable cargo rack assembly comprising:

a main arch including a leading edge facing a front end of the vehicle, a trailing edge facing a back end of the vehicle, a top segment, and a pair of side segments that extend downward from said top segment to a pair of body-side ends;

each of said pair of body-side ends including an insertion portion, said insertion portions of said pair of body-side ends being configured to be received in stake holes positioned in the cargo bed rails of the vehicle;

a support assembly having a pair of support arms that includes attachment ends configured to be pivotally connected to the cargo bed rails of the vehicle, said support assembly being pivotally connected to said top segment of said main arch for movement between a first configuration where said insertion portions of said body-side ends of said main arch are received in a forward pair of stake holes in the cargo bed rails of the vehicle and said pair of support arms extend out at an angle from said trailing edge of said main arch and a second configuration where said insertion portions of said body-side ends of said main arch are received in a rearward pair of stake holes in the cargo bed rails of the vehicle and said pair of support arms extend out at an angle from said leading edge of said main arch; and a pad assembly including a top half that extends over and is mounted to said main arch and a bottom half that is removably attached to at least one of said top half of said pad assembly and said top segment of said main arch.

11. The movable cargo rack assembly set forth in claim 10, wherein said top half and said bottom half of said pad assembly include a padded surface and wherein said bottom half of said pad assembly includes a slip resistant surface, opposite said padded surface, that is configured to rest on a roof of the vehicle when said bottom half of said pad assembly is removed from said top segment of said main arch.

12. The movable cargo rack assembly set forth in claim 10, further comprising:
  at least one tie-down strap for securing cargo to the main arch, wherein said main arch includes a storage cavity formed by said bottom half of said pad assembly that is configured to receive said at least one tie-down strap for storage when said at least one tie-down strap is not in use.

13. The movable cargo rack assembly set forth in claim 10, wherein each support arm includes a telescopic support arm including an upper tube and a lower tube with overlapping ends that are concentrically arranged and wherein each telescopic support arm includes a collar that threadably engages one of said overlapping ends of said upper and lower tubes to permit said upper and lower tubes to slide axially relative to one another in an unlocked position and that locks said upper and lower tubes in place in a locked position.

14. The movable cargo rack assembly set forth in claim 13, wherein said upper tubes of said pair of telescopic support arms are connected by a cross-bar that extends between the upper tubes and that is pivotally connected to said main arch.

15. A movable cargo rack assembly for installation on cargo bed rails of a vehicle, said movable cargo rack assembly comprising:
  a main arch including a top segment and a pair of side segments that extend downward from said top segment to a pair of body-side ends;
  said main arch having a leading edge that faces a front end of the vehicle and a trailing edge that faces a back end of the vehicle;
  each of said pair of body-side ends including an insertion portion, said insertion portions of said pair of body-side ends being configured to be removably and slidingly received in stake holes positioned in the cargo bed rails of the vehicle;
  said insertion portions of said pair of body-side ends of said main arch having a cross-sectional shape that is sized to fit inside the stake holes in the cargo bed rails of the vehicle;
  said insertion portions of said pair of body-side ends of said main arch including pin holes that are positioned in alignment with corresponding holes in the cargo bed rails of the vehicle when said insertion portions of said pair of body-side ends of said main arch are received in the stake holes in the cargo bed rails of the vehicle;
  a pair of main arch pins that are configured to be removably and slidingly received in said pin holes in said insertion portions of said pair of body ends of said main arch and the corresponding holes in the cargo bed rails of the vehicle to retain said insertion portions of said pair of body-side ends of said main arch in the stake holes in the cargo bed rails of the vehicle;
  said top segment and said pair of side segments of said main arch comprising a structural portion and an outer cowling that extends about at least part of said structural portion;
  said top segment of said main arch having an upper surface that faces away from the cargo bed rails of the vehicle and a lower surface that faces the cargo bed rails of the vehicle;
  a support assembly having a pair of telescopic support arms that include attachment ends configured to be pivotally connected to the cargo bed rails of the vehicle, said support assembly being pivotally connected to said top segment of said main arch for movement between a first configuration where said insertion portions of said body-side ends of said main arch are received in a forward pair of stake holes in the cargo bed rails of the vehicle and said pair of telescopic support arms extend out at an angle from said trailing edge of said main arch and a second configuration where said insertion portions of said body-side ends of said main arch are received in a rearward pair of stake holes in the cargo bed rails of the vehicle and said pair of telescopic support arms extend out at an angle from said leading edge of said main arch;
  each of said pair of telescopic support arms including an upper tube and a lower tube with overlapping ends that are concentrically arranged and a releasable coupling that permits said upper and lower tubes to slide axially relative to one another in an unlocked position and that locks said upper and lower tubes in place in a locked position;
  said attachment ends of said pair of telescopic support arms being positioned on and defined by said lower tubes;
  a pair of support assembly pins extending through said attachment ends to pivotally connect said attachment ends of said lower tubes to the cargo bed rails of the vehicle such that said attachment ends remain pivotally connected to the cargo bed rails of the vehicle when said movable cargo rack assembly is moved between said first and second configurations;
  said upper tubes of said pair of telescopic support arms being connected by a cross-bar that extends between the upper tubes and that is pivotally connected to said lower surface of said top segment of said main arch; and
  a pad assembly including a top half that extends over and is mounted to said upper surface of said top segment of said main arch and a bottom half that extends over said lower surface of said top segment of said main arch and that is removably attached to at least one of said top half of said pad assembly and said top segment of said main arch.

16. The movable cargo rack assembly set forth in claim 15, further comprising:
  at least one tie-down strap for securing cargo to the main arch, wherein said main arch includes a storage cavity formed by at least one of said bottom half of said pad assembly and said outer cowling that is configured to receive said at least one tie-down strap for storage when said at least one tie-down strap is not in use.

* * * * *